Patented July 2, 1940

2,206,354

UNITED STATES PATENT OFFICE 2,206,354

STARCH AMINES

Albert Aubrey Houghton, Saltcoats, Scotland, assignor to Imperial Chemical Industries Limited, a corporation of Great Britain No Drawing. Application March 28, 1938, Serial No. 198,584. In Great Britain April 6, 1937

19 Claims. (Cl. 260—211)

The present invention relates to the preparation of new derivatives of starch or other alkali-soluble carbohydrates (hereinafter exemplified by starch) and to their applications.

This invention has as an object to provide new derivatives of alkali-soluble carbohydrates. A further object is to provide such derivatives from which shaped masses and articles resistant to the action of aqueous alkaline solutions may be obtained. A still further object is to devise methods of manufacturing such derivatives. A still further object is to manufacture starch aryl sulfonates and starch amines. A still further object is to devise methods of manufacturing starch aryl sulfonates and starch amines. Further objects will appear hereinafter.

These objects are accomplished by the following invention.

I have found I can produce such derivative by a process comprising the steps of treating a dispersion of the carbohydrate in aqueous alkali with an aromatic sulfonyl halide to form an ester having not less than 0.9 aromatic sulfonyl substituent group, and preferably at least 1.5 groups per six-carbon unit of the carbohydrate; isolating the ester so formed from the reaction mass, and treating the ester with an aliphatic amine until a substantial proportion of the aromatic sulfonyl groups has been replaced by substituted amino groups.

In preparing the aromatic sulfonic ester of starch employed according to the present invention, the starch is caused to react by agitating it in presence of dilute alkali with an aromatic sulfonic acid halide. The proportion of aromatic sulfonic acid halide employed is considerably in excess of 1 molecule, e. g. about 4 molecules or more, per $C_6H_{10}O_5$ molecule of starch, and the amount of alkali employed is sufficient to ensure that the final mixture has an alkaline reaction and that none of the aromatic sulfonic acid halide remains unhydrolysed. The aromatic sulfonic ester quickly separates from the reaction mixture. It may be purified by washing with water or with a considerable bulk of alcohol, or with a mixture of alcohol and petroleum hydrocarbons. It may then be dried directly at a low temperature.

If the starch is treated with less than about 4 molecular proportions of aromatic sulfonic acid chloride, it is found that the subsequent production of the degree of amination corresponding to the desired solubility of the final product entails prolonged heating of the intermediate ester with the aliphatic amine; this degrades the starch and the final product has in consequence a poor water resistance.

In putting the invention into effect, the aromatic sulfonic acid ester of starch, advantageously in powder form, is treated with an excess of a primary or secondary aliphatic mono- or diamine at a preferably somewhat raised temperature, for example above 30° C. and preferably at 100° C. until the starch aromatic sulfonic ester has dispersed to form a clear viscous mass, and a test portion of the product when precipitated therefrom has become soluble in dilute aqueous acetic acid. The clear dispersion is then precipitated by the addition of water or other non-solvent liquid and the precipitate removed from the remaining liquid. Thereupon, it may be washed with water or other non-solvent in order to purify it from the adherent liquor, which contains excess of amine and amine salt in solution.

The invention is further illustrated by the following examples, in which the parts are parts by weight, unless otherwise described.

*Example 1*

10 parts of starch are mixed with water and the smooth paste is made up to 300 parts. 20 parts of caustic soda in 100 parts of water are added with stirring. To the clear viscous mass thus formed are added with very vigorous stirring 50 parts of benzene-1,2-dichloro-4-sulfonyl chloride. The mixing is continued until the reaction is complete, as shown by the temperature ceasing to rise. The starch ester thus formed is precipitated as a solid which is washed several times with water by decantation or by straining it through muslin, and finally with alcohol which is used in large excess to prevent the mass becoming plastic. The ester is dried in the air at room temperature. Analysis shows the product to contain 0.9 mol. of sulfonic acid radicle per glucose unit. The yield is 20 parts.

The product thus obtained is ground and sieved through a 36 mesh sieve. Of the dry powder thus obtained 2 parts are ground in a mortar with 5 parts of ethylene diamine. The paste thus formed is mixed with 15 parts of ethylene diamine. When the materials have become thoroughly mixed the whole is heated at 100° C. for 10 minutes. It is then quickly cooled, diluted with an equal volume of acetone and centrifuged to remove any residual solid. An excess of acetone is then added to the liquid and the product is thus precipitated. This is twice washed with acetone by decantation, filtered and dried in the air. It is readily soluble in dilute acetic acid to give a very viscous solution.

Analysis shows the product to contain 0.5 mol. of amine radicle and 0.4 mol. of residual sulfonic acid group per $C_6$ glucose unit. The yield is 0.9 part per part of starch originally taken.

*Example 2*

Starch 1,2-dichloro-4-sulfonate is prepared as in the previous experiment except that the alkaline solution of starch is cooled to 0° C. before the addition of the benzene-1,2-dichloro-4-sulfonyl chloride, and is maintained at that temperature until the reaction is complete. The product is isolated in the same way and contains 1.25 mol. of sulphonic radicle per $C_6$ glucose unit.

2 parts starch ester are ground with 5 parts of monoethanolamine and the mixture is diluted with a further 15 parts of ethanolamine. The suspension is then maintained at 100° C. until the mixture becomes clear. The mixture is then poured into a large excess of water with stirring, washed with water and alcohol and dried. The product contains 0.6 mol. of amine radicle and 0.6 mol. of sulfonic acid radicle per $C_6$ glucose unit. The product, which weighs 0.9 part, is soluble in dilute acetic acid giving a viscous solution.

The product so obtained is dissolved in 5% acetic acid so as to form a 1% solution into which there is introduced one-fifth of its weight of the pigment known by the registered trademark "Titanox." This is applied as a delustring dope for made-up textile goods, the fabric being dipped into the dope and squeezed out, whereupon it is treated with a bath of 1% sodium hydroxide and washed in running water and finally in a solution of ammonium chloride, and then again in water. A permanent dull effect is thus produced.

*Example 3*

1 part starch benzene-1,2-dichloro-4-sulfonate prepared as in Example 2 is treated with 10 parts of amylamine at 100° C. for 30 minutes. At the end of this time the mixture is poured into a mixture of equal parts of acetone and water, when the product is precipitated. This precipitate on being washed and dried is insoluble in dilute acetic acid but is soluble in concentrated acetic acid, from which solution it is precipitated by the addition of water. When precipitated in the form of a film the film does not become misty when water condenses on it.

*Example 4*

380 gm. starch are dispersed in 7,500 ml. water and thoroughly mixed with a solution of 800 gm. caustic soda in 2,500 ml. water. 1,850 gm. p-toluenesulfonyl chloride dissolved in 2,000 ml. benzene are added to the alkaline starch solution and allowed to react spontaneously. The temperature rises gradually to about 47°, and the ester precipitates. When the formation of ester is complete, the precipitate is filtered, extracted with a mixture of industrial alcohol and petroleum spirit, dried, ground and sieved to 36 mesh. The ester contains 1.65 p-toluenesulfonyl group per $C_6$ unit.

500 gm. of the starch ester are dispersed in 1,000 ml. monoethanolamine, and added to a further 3,000 ml. of monoethanolamine at 96°. The whole mixture is maintained at about 100° for an hour with vigorous stirring. The viscous solution so formed is precipitated with industrial alcohol, and the product filtered off, washed with alcohol, dried and ground. It contains 0.71 amino group and 0.58 p-toluenesulfonyl group per $C_6$ unit, and is soluble in aqueous acetic acid of concentrations down to 0.5%.

When 100 ml. of a 5% solution of the product in 5% acetic acid are emulsified with 100 ml. of liquid paraffin, a stable emulsion is formed.

When 100 ml. of a 5% solution of the product in 2% acetic acid are incorporated with 50 gm. molten paraffin wax at 70°, a stable emulsion is formed which does not separate when cooled.

In order to convert the starch aryl sulfonate into an amino starch it is necessary to have not less than 0.9 aromatic sulfonyl substituent group per glucose unit. The best results are given by an ester which contains 1.7 substituent groups. For the amine to be soluble in dilute acetic acid it is necessary that it should have at least 0.5 amino group per each glucose unit, my best results having 0.7 substituted amino group and 0.6 of the ester group.

In the above examples, instead of using starch, I could have used any other alkali-soluble carbohydrate, such as mannan; instead of the caustic soda used, I could have used caustic potash or any other water-soluble, inorganic base, or the soluble, organic tertiary bases, such as pyridine, dimethylaniline, tributylamine, and the like; instead of the aromatic sulfonyl halides mentioned, I could have used any of the following: benzenesulfonyl chloride, naphthalenesulfonyl chloride, 1,2-dichlorobenzene-4-sulfonyl bromide, p-toluenesulfonyl bromide, naphthalenesulfonyl bromide; instead of the amines mentioned, I could have used any primary or secondary aliphatic amine, such as diethanolamine, diethylamine, propylamine, butylamine, benzylamine,—as a rule, the lower amines are the more reactive, and produce better products.

Besides the starch-aryl-sulfonates mentioned in the examples, I could manufacture any of the following: starch benzenesulfonate, starch naphthalenesulfonate, mannan benzenesulfonate and mannan naphthalenesulfonate.

This invention is a valuable advance in the art, as the new starch derivatives are soluble in dilute aqueous organic acid media, such as 5% aqueous acetic acid or formic acid, yielding viscous solutions from which shaped articles resistant to the action of aqueous alkaline solutions may be obtained. As a consequence, they may be used as materials for the production of textile finishes, adhesives, films, and filaments, or for the like uses, or as protective colloids. Their ready solubility in dilute organic acids and their resistance to the action of dilute alkaline solutions renders them particularly suitable materials for the production of textile finishes.

The products obtained by the treatment of a p-toluenesulfonyl ester of starch with monoethanolamine (beta-amino-ethanol) are particularly suitable, being colourless, resistant to water and alkali, and free from discoloration under heat treatment, such as ironing.

As many apparently widely different embodiments of this invention can be made without departing from the spirit and scope thereof, it must be understood that I do not limit myself to the specific embodiments thereof, except as defined in the following claims.

I claim:

1. In a process for the preparation of starch amines soluble in dilute aqueous acid, the step which comprises treating a dispersion of starch in aqueous inorganic caustic alkali with an aryl sulfonyl halide.

2. A process of preparing starch amines soluble in dilute aqueous acetic acid which comprises treating a starch aryl sulfonate with an excess of an aliphatic amine having at least one free hydrogen on the amino nitrogen.

3. In a process of preparing starch amines soluble in 5% aqueous acetic acid, the step which comprises treating a starch aryl sulfonate with an excess of an aliphatic amine having at least one free hydrogen on the amino nitrogen until the product is soluble in 5% aqueous acetic acid.

4. In a process of preparing starch amines soluble in dilute aqueous acid, the step which comprises treating a dispersion of starch in aqueous inorganic caustic alkali with an aryl sulfonyl halide present in amount on molecular excess of the aryl sulfonyl halide until reaction is complete as evidenced by cessation of heat evolution.

5. An amino starch soluble in 5% aqueous acetic acid the amino group of which is derived from an aliphatic amine having at least one free hydrogen on the amino nitrogen and is attached by primary valence bonds to the starch nucleus.

6. In a process of preparing starch amines soluble in dilute aqueous acid, the step which comprises treating a starch aryl sulfonate with an excess of an aliphatic amine having at least one free hydrogen on the amino nitrogen, until at least 0.5 amino group has been introduced into the starch for each glucose unit.

7. In a process of preparing starch amines soluble in dilute aqueous acid, the step which comprises treating a starch aryl sulfonate with an excess of an aliphatic amine having at least one free hydrogen on the amino nitrogen until the starch molecule carries at least 0.5 amino group and at least 0.4 ester group for each glucose unit.

8. In a process of preparing starch amines soluble in dilute aqueous acid, the step which comprises treating a starch aryl sulfonate with an excess of an aliphatic amine having at least one free hydrogen on the amino nitrogen, until the starch molecule carries at least 0.7 amino group and at least 0.6 ester group for each glucose unit.

9. In a process for the preparation of starch amines soluble in dilute aqueous acid, the step which comprises treating a dispersion of starch in aqueous inorganic caustic alkali with an aryl sulfonyl halide until an ester is formed having at least 0.9 aromatic sulfonyl substituent group for each glucose unit.

10. A starch derivative carrying aromatic sulfonyl and substituted amino groups and soluble in 5% aqueous acetic acid, the amino group of said derivative being derived from an aliphatic amine having at least one free hydrogen on the amino nitrogen and being attached by primary valence bonds to the starch nucleus.

11. An amino starch having at least 0.5 amino group and 0.4 aromatic sulfonyl substituent group for each glucose unit and soluble in 5% aqueous acetic acid, the amino group of said derivative being derived from an aliphatic amine having at least one free hydrogen on the amino nitrogen and being attached by primary valence bonds to the starch nucleus.

12. An amino starch having at least 0.7 amino group and 0.6 aromatic sulfonyl substituent group for each glucose unit and soluble in 5% aqueous acetic acid, the amino group of said derivative being derived from an aliphatic amine having at least one free hydrogen on the amino nitrogen and being attached by primary valence bonds to the starch nucleus.

13. A process for the production of new derivatives of starch or other alkali-soluble carbohydrates comprising the steps of treating a dispersion of the carbohydrate in aqueous inorganic caustic alkali with an aromatic sulfonyl chloride to form an ester having not less than 0.9 aromatic sulfonyl group per six-carbon unit of the carbohydrate; isolating the ester so formed from the reaction mass; and treating the ester with an excess of an aliphatic amine having at least one free hydrogen on the amino nitrogen until a substantial proportion of the aromatic sulfonyl groups has been replaced by substituted amino groups.

14. Process as claimed in claim 13 in which which the aromatic sulfonyl chloride employed is p-toluenesulfonyl chloride.

15. Process as claimed in claim 13 in which the aromatic sulfonyl chloride employed is benzene-1,2-dichloro-4-sulfonyl chloride.

16. Process as claimed in claim 13 in which the aliphatic amine employed is monoethanolamine.

17. Process as claimed in claim 13 in which the treatment with aliphatic amine is carried out at a temperature of approximately 100°.

18. A beta-hydroxyethylaminostarch soluble in 5% aqueous acetic acid.

19. Process which comprises treating a starch aryl sulfonate with beta-aminoethanol until the product is soluble in 5% aqueous acetic acid.

ALBERT AUBREY HOUGHTON.

CERTIFICATE OF CORRECTION.

Patent No. 2,206,354. July 2, 1940.

ALBERT AUBREY HOUGHTON.

It is hereby certified that error appears in the printed specification of the above numbered patent requiring correction as follows: Page 2, first column, line 10, after the word "Starch" insert --benzene--; page 3, first column, line 19, claim 4, for "on" read --in--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.